(12) United States Patent
Alspector et al.

(10) Patent No.: US 8,799,387 B2
(45) Date of Patent: Aug. 5, 2014

(54) ONLINE ADAPTIVE FILTERING OF MESSAGES

(75) Inventors: Joshua Alspector, Chantilly, VA (US); Aleksander Kolcz, Fairfax, VA (US)

(73) Assignee: AOL Inc., Dulles, VA (US)

( * ) Notice: Subject to any disclaimer, the term of this patent is extended or adjusted under 35 U.S.C. 154(b) by 0 days.

(21) Appl. No.: 13/541,033

(22) Filed: Jul. 3, 2012

(65) Prior Publication Data

US 2013/0007152 A1 Jan. 3, 2013

Related U.S. Application Data

(62) Division of application No. 10/743,015, filed on Dec. 23, 2003, now Pat. No. 8,214,437.

(60) Provisional application No. 60/488,396, filed on Jul. 21, 2003.

(51) Int. Cl.
*G06F 15/16* (2006.01)
(52) U.S. Cl.
USPC .......................................... 709/206; 709/207
(58) Field of Classification Search
None
See application file for complete search history.

(56) References Cited

U.S. PATENT DOCUMENTS

| | | | | |
|---|---|---|---|---|
| 6,161,130 A * | 12/2000 | Horvitz et al. | ................ | 709/206 |
| 6,199,103 B1 * | 3/2001 | Sakaguchi et al. | ............ | 709/206 |
| 6,321,267 B1 * | 11/2001 | Donaldson | .................... | 709/229 |
| 6,330,590 B1 * | 12/2001 | Cotten | .......................... | 709/206 |
| 6,393,465 B2 | 5/2002 | Leeds | | |
| 6,421,709 B1 | 7/2002 | McCormick et al. | | |
| 6,507,866 B1 | 1/2003 | Barchi | | |
| 6,654,787 B1 | 11/2003 | Aronson et al. | | |
| 6,732,157 B1 * | 5/2004 | Gordon et al. | ................ | 709/206 |
| 6,901,398 B1 | 5/2005 | Horitz et al. | | |
| 7,051,077 B2 | 5/2006 | Lin | | |
| 7,219,148 B2 * | 5/2007 | Rounthwaite et al. | ........ | 709/224 |
| 7,272,853 B2 * | 9/2007 | Goodman et al. | ............... | 726/13 |
| 7,293,013 B1 | 11/2007 | Horvitz et al. | | |
| 7,320,020 B2 * | 1/2008 | Chadwick et al. | ............ | 709/206 |
| 7,483,947 B2 * | 1/2009 | Starbuck et al. | ............. | 709/206 |
| 7,519,668 B2 * | 4/2009 | Goodman et al. | ............ | 709/206 |
| 7,640,313 B2 | 12/2009 | Rounthwaite et al. | | |

(Continued)

OTHER PUBLICATIONS

H. Drucker et al., "Support Vector Machines for Spam Categorization," *IEEE Transactions on Neural Networks*, vol. 10, No. 5, (Sep. 1999).

(Continued)

*Primary Examiner* — Ninos Donabed
(74) *Attorney, Agent, or Firm* — Finnegan, Henderson, Farabow, Garrett & Dunner LLP

(57) ABSTRACT

In general, a two or more stage spam filtering system is used to filter spam in an e-mail system. One stage includes a global e-mail classifier that classifies e-mail as it enters the e-mail system. The parameters of the global e-mail classifier generally may be determined by the policies of e-mail system owner and generally are set to only classify as spam those e-mails that are likely to be considered spam by a significant number of users of the e-mail system. Another stage includes personal e-mail classifiers at the individual mailboxes of the e-mail system users. The parameters of the personal e-mail classifiers generally are set by the users through retraining, such that the personal e-mail classifiers are refined to track the subjective perceptions of their respective user as to what e-mails are spam e-mails.

26 Claims, 3 Drawing Sheets

(56) References Cited

U.S. PATENT DOCUMENTS

| | | | |
|---|---|---|---|
| 7,680,886 | B1* | 3/2010 | Cooley .................. 709/206 |
| 7,711,779 | B2 | 5/2010 | Goodman et al. |
| 2002/0116463 | A1 | 8/2002 | Hart |
| 2002/0116641 | A1 | 8/2002 | Mastrianni |
| 2002/0181703 | A1* | 12/2002 | Logan et al. ............... 380/30 |
| 2002/0199095 | A1* | 12/2002 | Bandini et al. ............. 713/151 |
| 2003/0172167 | A1* | 9/2003 | Judge et al. ............... 709/229 |
| 2004/0003283 | A1 | 1/2004 | Goodman et al. |
| 2004/0019651 | A1* | 1/2004 | Andaker ................... 709/207 |
| 2004/0177110 | A1* | 9/2004 | Rounthwaite et al. ....... 709/202 |
| 2004/0267893 | A1 | 12/2004 | Lin |
| 2005/0015452 | A1 | 1/2005 | Corson |
| 2005/0015454 | A1* | 1/2005 | Goodman et al. ........... 709/207 |
| 2005/0015626 | A1 | 1/2005 | Chasin |
| 2005/0060643 | A1 | 3/2005 | Glass et al. |
| 2006/0168006 | A1 | 7/2006 | Shannon et al. |

OTHER PUBLICATIONS

M. Hearst et al., "Support Vector Machines," *IEEE Intelligent Systems* (Jul./Aug. 1998).

T. Joachims, "Text Categorization with Support Vector Machines: Learning with Many Relevant Features," *University of Dortmund, Computer Science Dept., LS-8 Report 23* (1998).

M. Marvin, "Announce: Implementation of E-mail Spam Proposal," News.admin.net-abuse.misc.(Aug. 3, 1996).

H. Zaragoza et al., "Machine Learning and Textual Information Access," *Proceedings of the Workshop, 4th European Conference on Principles and Practice of Knowledge Discovery in Databases (PKDD-2000)*, Lyon, France, pp. 1-13 (Sep. 2000).

Hall, "A Countermeasure to Duplicate-detecting Anti-spam Techniques," *AT&T Labs, Technical Report 99.9.1* (1999).

S. Hird, "Technical Solutions for Controlling Spam," *Proceedings of AUUG2002*, Melbourne, 4-6 (Sep. 2002).

H. Zaragoza et al., "Learning to Filter Spam E-Mail: Comparison of a Naïve Bayesian and a Memory-Based Approach," 4th European Conference on Principles and Practice of Knowledge Discovery in Databases (PKDD-2000), Lyon, France, pp. 1-12 (Sep. 2002).

Bart Massey et al., "Learning Spam: Simple Techniques fore Freely-Available Software," *Computer Science Dept.*, Portland, OR USA, pp. 1-14 (2003).

"Better Bayesian Filtering," www.paulgraham.com/better.html, pp. 1-11 (Jan. 2003).

A. Kolcz and J. Alspector, "SVM-based Filtering of E-mail Spam with Content-specific Misclassification Costs," *TextDM'2001 (IEEE ICDM-2001 Workshop on Text Mining)*, San Jose, CA (2001).

J. Dudley, "Telstra Targets Net Spammers," http://www.news.com.au/common, pp. 1-2 (Dec. 2, 2003).

* cited by examiner

ONLINE ADAPTIVE FILTERING OF MESSAGES

CLAIM OF PRIORITY

This application is a division of application Ser. No. 10/743,015, filed Dec. 23, 2003 now U.S. Pat. No. 8,214,437 (allowed), which claims priority under 35 USC §119(e) to U.S. Patent Application titled "Online Adaptive Filtering of Messages," Ser. No. 60/488,396, filed on Jul. 21, 2003, the entire contents of which are hereby incorporated by reference.

TECHNICAL FIELD

This description relates to spam filtering.

BACKGROUND

With the advent of the Internet and a decline in computer prices, many people are communicating with one another through computers interconnected by networks. A number of different communication mediums have been developed to facilitate such communications between computer users. One type of prolific communication medium is electronic mail (e-mail).

Unfortunately, because the costs of sending e-mail are relatively low, e-mail recipients are being subjected to mass, unsolicited, commercial e-mailings (colloquially known as e-mail spam or spam e-mails). These are akin to junk mail sent through the postal service. However, because spam e-mail requires neither paper nor postage, the costs incurred by the sender of spam e-mail are quite low when compared to the costs incurred by conventional junk mail senders. Due to this and other factors, e-mail users now receive a significant amount of spam e-mail on a daily basis.

Spam e-mail impacts both e-mail users and e-mail providers. For e-mail users, spam e-mail can be disruptive, annoying, and time consuming. For an e-mail service provider, spam e-mail represents tangible costs in terms of storage and bandwidth usage. These costs may be substantial when large numbers of spam e-mails are sent.

Thus, particularly for large email service providers (ESPs), such as Internet service providers (ISPs) and corporations, it is beneficial to stop spam before it enters the e-mail system. Stopping unwanted e-mails before they enter the system keeps down an ESP's storage and bandwidth costs and provides a better quality of service to the ESP's users. On the other hand, preventing the delivery of wanted e-mail decreases the quality of service to the ESP's users, perhaps to an unacceptable degree, at least from the perspective of the users.

Unfortunately, effective filtering of spam has proved to be difficult, particularly for large ESPs. One reason for the difficulty is the subjective nature of spam, i.e. the decision as to what constitutes spam is very subjective in nature. While some categories of unsolicited e-mail, such as pornographic material, are likely to be unwanted and even offensive to the vast majority of people, this is not necessarily true about other categories of unsolicited e-mail. For example, some users may deem all unsolicited invitations to be spam, while other users may welcome invitations to professional conferences, even if such invitations were not explicitly solicited.

Another reason for the difficulty is that there may be some solicited (i.e., wanted) e-mails that closely resemble spam. For example, some e-commerce related e-mails, such as order confirmations, may resemble spam. Likewise, some promotional offers actually may be solicited by the user, i.e. the user may sign-up for promotional offers from a particular merchant.

SUMMARY

In one aspect, a method of handling messages in a messaging system is provided. The message system includes a message gateway and individual message boxes for users of the system and a message addressed to a user is delivered to the user's message box after passing through the message gateway. A global, scoring e-mail classifier is knowingly biased relative to a personal, scoring e-mail classifier such that the global e-mail classifier is less stringent than the personal e-mail classifier as to what is classified as spam. Messages received at the message gateway are input into the global, scoring e-mail classifier to classify the input messages as spam or non-spam. At least one of the messages input into the global, scoring e-mail classifier is handled based on whether the global, scoring e-mail classifier classified the at least one message as spam or non-spam. At least one message classified as non-spam by the global, scoring e-mail classifier is input into the personal, scoring e-mail classifier to classify the at least one message as spam or non-spam. The at least one message input into the personal, scoring e-mail classifier is handled based on whether the personal, scoring e-mail classifier classified the at least one message as spam or non-spam.

In another aspect, a system for handling messages is provided. The system includes a message gateway and individual message boxes for users of the system. A message addressed to a user is delivered to the user's message box after passing through the message gateway. The system also includes a global, scoring e-mail classifier and at least one personal, scoring e-mail classifier. The global, scoring e-mail classifier classifies messages coming into the messaging gateway as spam or non-spam. The at least one personal, scoring e-mail classifier classifies messages coming into at least one individual message box as spam or non-spam. The global, scoring e-mail classifier is knowingly biased relative to the personal, scoring e-mail classifier such that the global, scoring e-mail classifier is less stringent than the personal, scoring e-mail classifier as to what is classified as spam.

Implementations of these aspects may include one or more of the following features. For example, the global, scoring e-mail classifier may be a probabilistic e-mail classifier such that, to classify a message, the global, scoring e-mail classifier uses an internal model to determine a probability measure for the message and compares the probability measure to a classification threshold. To develop the internal model, the global, scoring e-mail classifier may be trained using a training set of messages.

The personal, scoring e-mail classifier may be a probabilistic classifier such that, to classify a message, the personal, scoring e-mail classifier uses an internal model to determine a probability measure for the message and compares the probability measure to a classification threshold. The personal, scoring e-mail classifier's internal model may be initialized using the internal model for the global, scoring e-mail classifier. To develop the internal model, the personal, scoring e-mail classifier may be trained using a training set of messages.

To bias the global, scoring e-mail classifier relative to the personal, scoring e-mail classifier, the classification threshold for the global, scoring e-mail classifier may be set higher than the classification threshold for the personal, scoring e-mail classifier.

The training set of messages may include messages that are known to be spam messages to a significant number of users of the messaging system. The training set of messages may be collected through feedback from the users of the messaging system.

A user may be allowed to change the classification of a message. The personal, scoring e-mail classifier may be retrained based on the change of classification of the message such that the personal, scoring e-mail classifier's internal model is refined to track the user's subjective perceptions as to what messages constitute spam messages.

The global, scoring e-mail classifier may be trained based on higher misclassification costs than the personal, scoring e-mail classifier to knowingly bias the global, scoring e-mail classifier relative to the personal, scoring e-mail classifier.

The messages may be e-mails, instant messages, or SMS messages.

The global, scoring e-mail classifier may be configured such that classifying messages as spam includes classifying messages into subcategories of spam. Similarly, the personal, scoring e-mail classifier may be configured such that classifying messages as spam or non-spam includes classifying messages into subcategories of spam or non-spam.

In another aspect, a method of operating a spam filtering system in a messaging system is provided. The messaging system includes a message gateway and individual message boxes for users of the system. A global, scoring e-mail classifier classifies messages coming into the message gateway as spam or non-spam and a personal, scoring e-mail classifiers classify messages delivered to the individual message boxes after passing through the global, scoring e-mail classifier. Personal retraining data used to retrain the personal, scoring e-mail classifiers is aggregated. The personal retraining data for an individual message box is based on a user's feedback about the classes of messages in the user's individual message box. A subset of the aggregated personal retraining data is selected as global retraining data. The global, scoring e-mail classifier is retrained based on the global retraining data so as to adjust which messages are classified as spam.

Implementations of this aspect may include one or more of the following features. The user feedback may be explicit. The explicit user feedback may include one or more of the following: a user reporting a message as spam; moving a message from an Inbox folder in the individual message box to a Spam folder in the individual message box; or moving a message from an Spam folder in the individual message box to a Inbox folder in the individual message box.

The feedback may be implicit. The implicit feedback may include one or more of the following: keeping a message as new after the message has been read; forwarding a message; replying to a message; printing a message; adding a sender of a message to an address book; or not explicitly changing a classification of a message.

The aggregated personal retraining data may include messages. The feedback may include changing a message's class. Selecting a subset of the aggregated personal retraining data may include determining a difference between a probability measure calculated for a message by the global, scoring e-mail classifier and a classification threshold of the global, scoring e-mail classifier; and selecting the message as global retraining data if a magnitude of the difference exceeds a threshold difference. Selecting a subset of the aggregated personal retraining data may include selecting a message as global retraining data when a particular number of users change the message's classification. The messages may be e-mails, instant messages, or SMS messages.

To classify a message, the global, scoring e-mail classifier may use an internal model to determine a probability measure for the message and compare the probability measure to a classification threshold. To classify a message, the personal, scoring e-mail classifier may use an internal model to determine a probability measure for the message and compare the probability measure to a classification threshold. The personal, scoring e-mail classifier's internal model may be initialized using the internal model for the global, scoring e-mail classifier.

Implementations of the described techniques may include hardware, a method or process, or computer software on a computer-accessible medium.

Implementations of such multiple stage filtering may have one or more of the following advantages. Generally, it may allow an ESP to filter items on a global level based on the policy or business decisions of the ESP, while allowing items to be filtered at a personal level along a user's personal preferences or usefulness. As a specific example, it may allow an ESP to set the stringency of the spam filtering at the system level by policy, while allowing the stringency of the spam filtering at the personal level to be set by a user's subjective perceptions of what constitutes spam. By setting the stringency at the system level such that only e-mails with a very high likelihood of being spam are filtered, the ESP may be able to reduce network traffic and storage costs by preventing a portion of spam e-mails from entering the network. Meanwhile, by enabling personalized filtering, the ESP may decrease the possibility of filtering out legitimate e-mails. The user then can train the personal e-mail classifier to the user's specific considerations of what constitutes spam in order to filter the rest of the e-mails.

The details of one or more implementations are set forth in the accompanying drawings and the description below. Other features will be apparent from the description and drawings, and from the claims.

DETAILED DESCRIPTION

In general, a two or more stage spam filtering system is used to filter spam in an e-mail system. One stage includes a global e-mail classifier that classifies e-mail as it enters the e-mail system. The parameters of the global e-mail classifier generally may be determined by the policies of e-mail system owner and generally are set to only classify as spam those e-mails that are likely to be considered spam by a significant number of users of the e-mail system. Another stage includes personal e-mail classifiers at the individual mailboxes of the e-mail system users. The parameters of the personal e-mail classifiers generally are set by the users through retraining, such that the personal e-mail classifiers are refined to track the subjective perceptions of their respective user as to what e-mails are spam e-mails.

A personal e-mail classifier may be retrained using personal retraining data that is collected based on feedback derived implicitly or explicitly from the user's reaction to the e-mail, which may indicate the user's characterization of the actual classes of the e-mails in the user's mailbox. The user may explicitly or implicitly indicate the user's subjective perception as to the class of an e-mail in the mailbox. The actual class (as considered by the user), along with the e-mail, are used to retrain the personal e-mail classifier.

The personal retraining data for the multiple personal e-mail classifiers in the system may be aggregated, and a subset of that data may be used as global retraining data to retrain the global e-mail classifier. The parameters of the global e-mail classifier may be used to initialize new personal e-mail classifiers.

Figure 1:
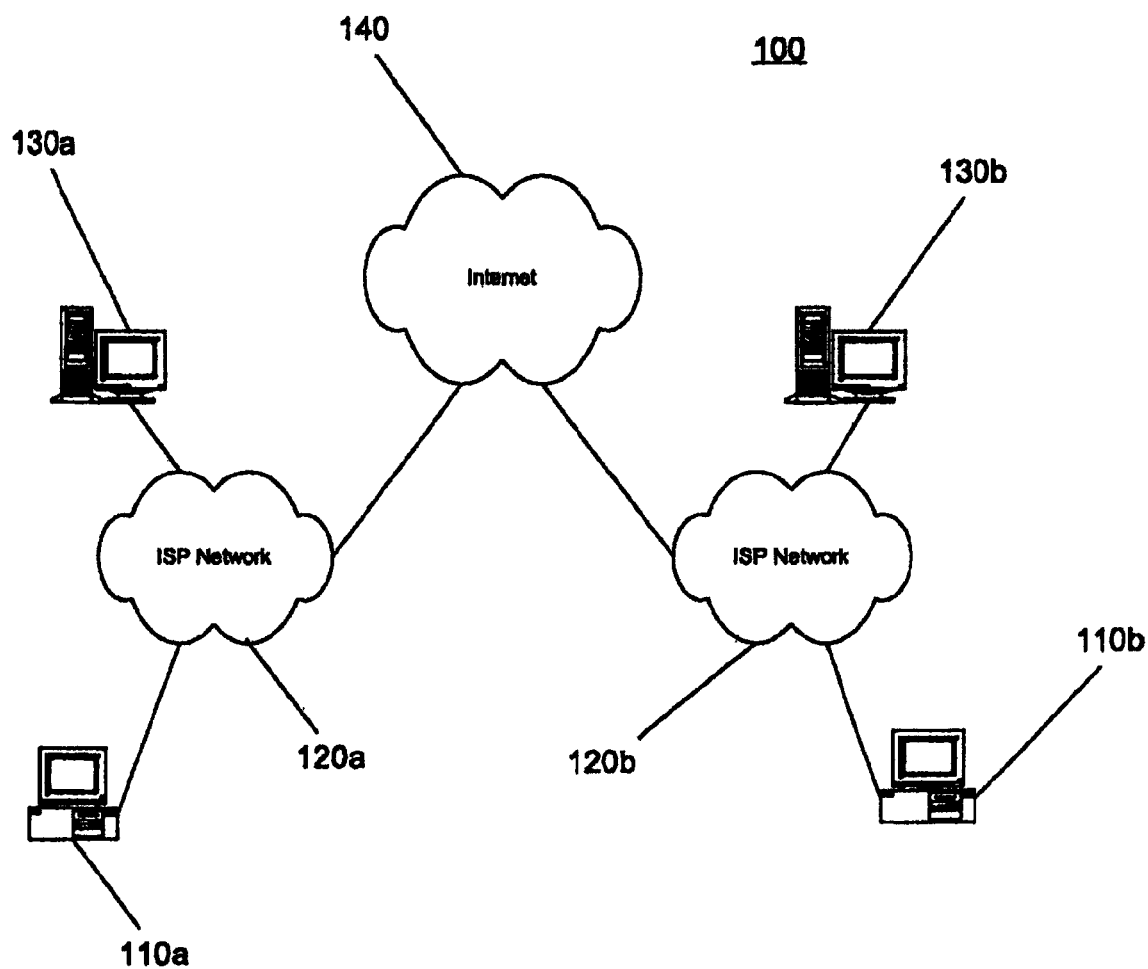
FIG. 1 is a block diagram of an exemplary networked computing environment that supports e-mail communications and in which spam filtering may be performed.

FIG. 1 illustrates an exemplary networked computing environment 100 that supports e-mail communications and in which spam filtering may be performed. Computer users are distributed geographically and communicate using client systems 110a and 110b. Client systems 110a and 110b are connected to ISP networks 120a and 120b, respectively. While illustrated as ISP networks, networks 120a or 120b may be any network, e.g., a corporate network. Clients 110a and 110b may be connected to the respective ISP networks 120a and 120b through various communication channels such as a modem connected to a telephone line (using, for example, serial line internet protocol (SLIP) or point-to-point protocol (PPP)), a direct network connection (using, for example, transmission control protocol/internet protocol (TCP/IP)), a wireless Metropolitan Network, or a corporate local area network (LAN). E-mail or other messaging servers 130a and 130b also are connected to ISP networks 120a and 120b, respectively. ISP networks 120a and 120b are connected to a global network 140 (e.g., the Internet) such that a device on one ISP network can communicate with a device on the other ISP network. For simplicity, only two ISP networks 120a and 120b have been illustrated as connected to Internet 140. However, there may be a large number of such ISP networks connected to Internet 140. Likewise, many e-mail servers and many client systems may be connected to each ISP network.

Each of the client systems 110a and 110b and e-mail servers 130a and 130b may be implemented using, for example, a general-purpose computer capable of responding to and executing instructions in a defined manner, a personal computer, a special-purpose computer, a workstation, a server, a device such as a personal digital assistant (PDA), a component, or other equipment or some combination thereof capable of responding to and executing instructions. Client systems 110a and 110b and e-mail servers 130a and 130b may receive instructions from, for example, a software application, a program, a piece of code, a device, a computer, a computer system, or a combination thereof, which independently or collectively direct operations. These instructions may take the form of one or more communications programs that facilitate communications between the users of client systems 110a and 110b. Such communications programs may include, for example, e-mail programs, instant messaging (IM) programs, file transfer protocol (FTP) programs, or voice-over-IP (VoIP) programs. The instructions may be embodied permanently or temporarily in any type of machine, component, equipment, storage medium, or propagated signal that is capable of being delivered to a client system 110a and 110b or the e-mail servers 130a and 130b.

Each of client systems 110a and 110b and e-mail servers 130a and 130b includes a communications interface (not shown) used by the communications programs to send/receive communications. The communications may include, for example, e-mail, audio data, video data, general binary data, or text data (e.g., data encoded in American Standard Code for Information Interchange (ASCII) format or Unicode).

Examples of ISP networks 120a and 120b include Wide Area Networks (WANs), Local Area Networks (LANs), analog or digital wired and wireless telephone networks (e.g., a Public Switched Telephone Network (PSTN), an Integrated Services Digital Network (ISDN), or a Digital Subscriber Line (xDSL)), or any other wired or wireless network. Networks 120a and 120b may include multiple networks or subnetworks, each of which may include, for example, a wired or wireless data pathway.

Each of e-mail servers 130a and 130b may handle e-mail for e-mail users connected to ISP network 110a or 110b. Each e-mail server may handle e-mail for a single e-mail domain (e.g., aol.com), for a portion of a domain, or for multiple e-mail domains. While not shown, there may be multiple, interconnected e-mail servers working together to provide e-mail service for e-mail users of an ISP network.

An e-mail user, such as a user of client system 110a or 110b, typically has one or more related e-mail mailboxes on the e-mail system that incorporates e-mail server 130a or 130b. Each mailbox corresponds to an e-mail address. Each mailbox may have one or more folders in which e-mail is stored. E-mail sent to one of the e-mail user's e-mail addresses is routed to the corresponding e-mail server 130a or 130b and placed in the mailbox that corresponds to the e-mail address to which the e-mail was sent. The e-mail user then uses, for example, an e-mail client program executing on client system 110a or 110b to retrieve the e-mail from e-mail server 130a, 130b and view the e-mail.

The e-mail client program may be, for example, a stand-alone e-mail application such as Microsoft Outlook or an e-mail client application that is integrated with an ISP's client for accessing the ISP's network, such as America Online (AOL) Mail, which is part of the AOL client. The e-mail client program also may be, for example, a web browser that accesses web-based e-mail services.

The e-mail client programs executing on client systems 110a and 110b also may allow one of the users to send e-mail to an e-mail address. For example, the e-mail client program executing on client system 110a may allow the e-mail user of client system 110a (the sending user) to compose an e-mail message and address the message to a recipient address, such as an e-mail address of the user of client system 110b. When the sender indicates the e-mail is to be sent to the recipient address, the e-mail client program executing on client system 110a communicates with e-mail server 130a to handle the sending of the e-mail to the recipient address. For an e-mail addressed to an e-mail user of client system 110b, for example, e-mail server 130a sends the e-mail to e-mail server 130b. E-mail server 130b receives the e-mail and places it in the mailbox that corresponds to the recipient address. The user of client system 110b may then retrieve the e-mail from e-mail server 130b, as described above.

In an e-mail environment, such as that shown by FIG. 1, a spammer typically uses an e-mail client or server program to send similar spam e-mails to hundreds, if not millions, of e-mail recipients. For example, a spammer may target hundreds of recipient e-mail addresses serviced by e-mail server 130b on ISP network 120b. The spammer may maintain the list of targeted recipient addresses as a distribution list. The spammer may use the e-mail program to compose a spam e-mail and instruct the e-mail client program to use the distribution list to send the spam e-mail to the recipient addresses. The e-mail is then sent to e-mail server 130b for delivery to the recipient addresses. Thus, in addition to receiving legitimate e-mails, e-mail server 130*b* also may receive large quantities of spam e-mail, particularly when many hundreds of spammers target e-mail addresses serviced by e-mail server 130*b*.

Figure 2:
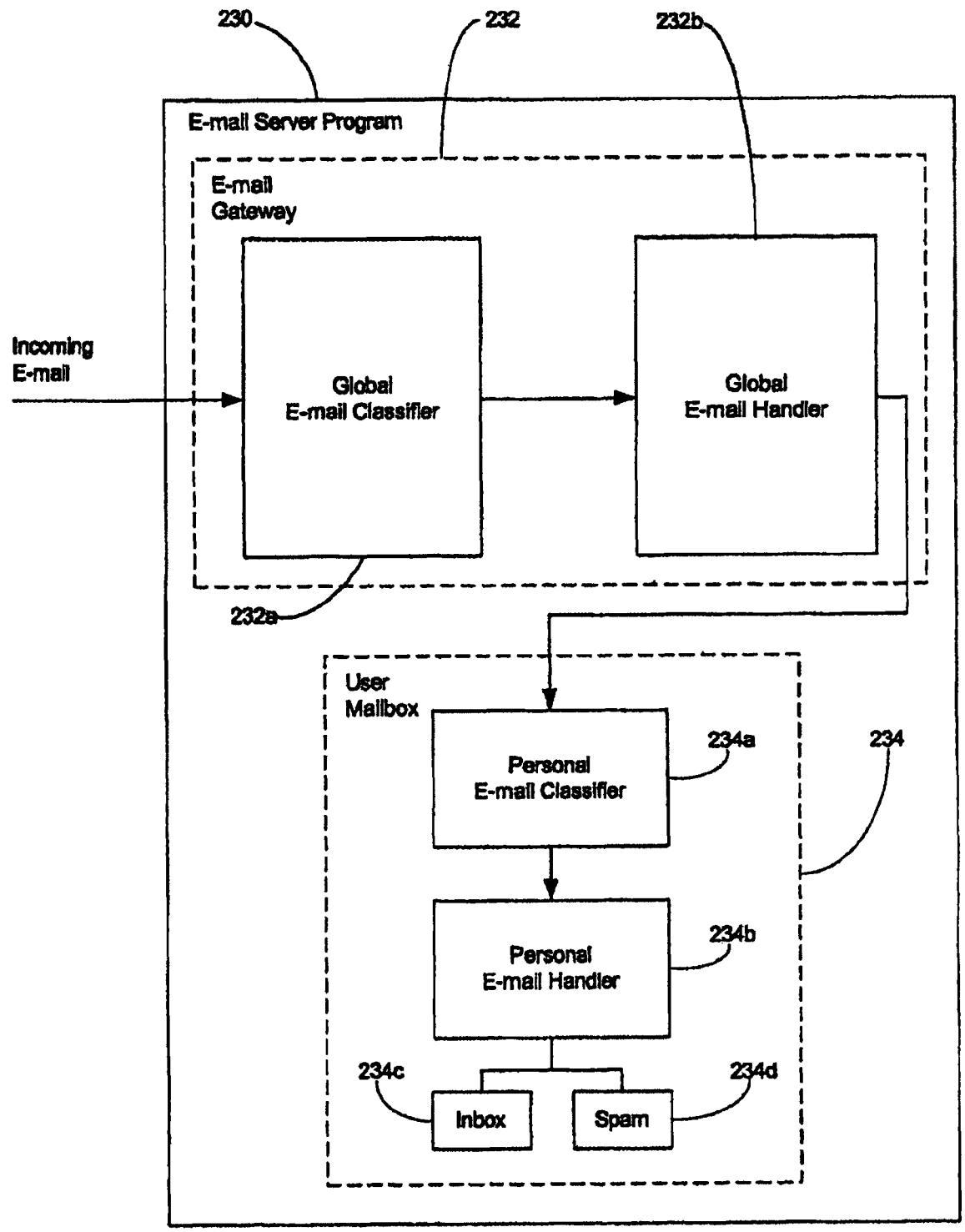
FIG. 2 is a high-level functional block diagram of an e-mail server program that may execute on an e-mail server to provide large-scale spam filtering.

FIG. 2 is a high-level functional block diagram of an e-mail server program 230 that may execute on an e-mail system, which may incorporate e-mail server 130*a* or 130*b*, to provide spam filtering. Program 230 includes an e-mail gateway 232 that receives all incoming e-mail to be delivered to user mailboxes serviced by the e-mail server and a user mailbox 234. While only one user mailbox is shown, in practice there will tend to be multiple user mailboxes, particularly if the e-mail server is a server for a large ESP. E-mail gateway 232 includes a global e-mail classifier 232*a* and a global e-mail handler 232*b*. User mailbox 234 includes a personal e-mail classifier 234*a* and a personal e-mail handler 234*b*, along with mail folders, such as Inbox folder 234*c* and Spam folder 234*d*.

In the implementation shown by FIG. 2, personal e-mail classifier 234*a* is implemented host-side, i.e. as part of the e-mail server program 230 included as part of the e-mail system running on, for example, ISP network 120*b*. Operating personal e-mail classifier 234*a* host side provides for greater mobility of an e-mail user. The user may access his or her e-mail from multiple, different client devices and cause personal e-mail classifier to be retrained as described below regardless of which client device is used. Personal e-mail classifier 234*a*, however, may be implemented client-side.

Also, the implementation shown by FIG. 2 illustrates a single personal e-mail classifier 234*a* used with a single user mailbox 234. However, a single personal e-mail classifier may be used for multiple user mailboxes. For instance, some ISPs allow a single user or account to have multiple user mailboxes associated with the user/account. In that case, it may be advantageous to use a single personal e-mail classifier for the multiple user mailboxes associated with the single account. The single personal classifier then may be trained based on feedback acquired based on the multiple user mailboxes. Alternatively, a single personal e-mail classifier may be used with each of the mailboxes, even if they are associated with a single account.

During operation, the incoming e-mail arriving at e-mail server program 230 passes through global e-mail classifier 232*a*. Global e-mail classifier 232*a* classifies incoming e-mail by making a determination of whether a particular e-mail passing through classifier 232*a* is spam or legitimate e-mail (i.e., non-spam e-mail) and classifying the e-mail accordingly (i.e., as spam or legitimate), which, as described further below, may include explicitly marking the e-mail as spam or legitimate or may include marking the e-mail with a spam score. Global e-mail classifier 232*a* then forwards the e-mail and its classification to global e-mail handler 232*b*. Global e-mail handler 232*b* handles the e-mail in a manner that depends on the policies set by the e-mail service provider. For example, global e-mail handler 232*b* may delete e-mails marked as spam, while delivering e-mails marked as legitimate to the corresponding user mailbox. Alternatively, legitimate e-mail and e-mail labeled as spam both may be delivered to the corresponding user mailbox so as to be appropriately handled by the user mailbox.

When an e-mail is delivered to user mailbox 234, it passes through personal e-mail classifier 234*a*. Personal e-mail classifier 234*a* also classifies incoming e-mail by making a determination of whether a particular e-mail passing through classifier 234*a* is spam or legitimate e-mail (i.e., non-spam e-mail) and classifying the e-mail accordingly (i.e., as spam or legitimate). Personal e-mail classifier 234*a* then forwards the e-mail and its classification to personal e-mail handler 234*b*.

If global e-mail classifier 232*b* delivers all e-mail to user mailbox 234 and an e-mail has already been classified as spam by global e-mail classifier 232*a*, then the classified e-mail may be passed straight to personal e-mail handler 234*b*, without being classified by personal e-mail classifier 234*a*. Alternatively, all e-mail delivered to user mailbox 234 may be processed by personal e-mail classifier 234*a*. In this case, the classification of an e-mail as spam by global e-mail classifier 232*a* may be used as an additional parameter for personal e-mail classifier 234*a* when classifying incoming e-mail and may be based, e.g., on a spam score of a message.

Personal e-mail handler 234*b* handles the classified e-mail accordingly. For example, e-mail handler 234*b* may delete e-mails marked as spam, while delivering e-mails marked as legitimate to Inbox folder 234*c*. Alternatively, e-mail labeled as spam may be delivered to Spam folder 234*d* instead of being deleted. How e-mail is handled by personal e-mail handler 234*b* may be configurable by the mail recipient.

Additionally or alternatively, visual indicators may be added to the e-mails so as to indicate whether the e-mails are spam or legitimate. For instance, all of the e-mails may be placed in the same folder and, when displayed, all or a portion of the legitimate e-mails may contain one color while the spam e-mails may contain another color. Furthermore, when displayed, the e-mails may be ordered according to their classifications, i.e., all of the spam e-mails may be displayed together while all the legitimate e-mails are displayed together.

Both global e-mail classifier 232*a* and personal e-mail classifier 234*a* may be probabilistic classifiers. For example, they may be implemented using a Naïve Bayesian classifier or a limited dependence Bayesian classifier. While generally described as probabilistic classifiers, non-probabilistic techniques may be used to implement classifiers 232*a* and 234*a* as described further below. For example, they may be implemented using a support vector machine (SVM) or perceptron. Furthermore, global e-mail classifier 232*a* may be implemented according to the teachings of the co-pending U.S. Patent Application, entitled "Classifier Tuning Based On Data Similarities," filed Dec. 22, 2003, incorporated herein by reference.

Generally, as probabilistic classifiers, classifiers 232*a* and 234*a* make a determination of whether or not an e-mail is spam by first analyzing the e-mail to determine a confidence level or probability measure that the e-mail is spam. That is, the classifiers 232*a* and 234*a* determine a likelihood or probability that the e-mail is spam. If the probability measure is above a classification threshold, then the e-mail is classified as spam. The comparison between the measure and the classification threshold may be performed immediately after the measure is determined, or at any later time.

The classification threshold may be predetermined or adaptive. For example, the threshold may be a preset quantity (e.g., 0.99) or the threshold may be a quantity that is adaptively determined during the operation of classifiers 232*a* and 234*a*. The threshold may, for instance, be the probability measure that the e-mail being evaluated is legitimate. That is, the probability that an e-mail is spam may be compared to the e-mail's probability of being legitimate. The e-mail then is classified as spam when the probability measure of the e-mail being spam is greater than the probability measure of the e-mail being legitimate.

Before global e-mail classifier 232*a* is used to classify incoming e-mail, global e-mail classifier 232*a* is trained using standard techniques known in the art. Then, during use, global e-mail classifier 232a is retrained as described below.

For training, a training set of e-mail is used to develop an internal model that allows global e-mail classifier 232a to determine a measure for unknown e-mail. For example, in an implementation using an SVM, the training e-mail is used to develop the hyperplane boundary, while, for a Naïve Bayes implementation, the training e-mail is used to develop the relevant probabilities. A number of features may be used to develop the internal model. For example, the text of the e-mail body may be used, along with header information such as the sender's e-mail address, any mime types associated with the e-mail's content, the IP address of the sender, or the domain of the sender.

When a user mailbox 234 is first created, the internal model for global e-mail classifier 232a may be used to initialize personal e-mail classifier 234a. That is, the parameters for the internal model of global e-mail classifier 232a may be used to initialize the internal model of personal e-mail classifier 234a. Alternatively, personal e-mail classifier 234a may be explicitly trained using a training set of e-mail to develop its own internal model. One may want to explicitly train personal e-mail classifier 234a when the training algorithms of global e-mail classifier 232a and personal e-mail classifier 234a differ. They may differ, for example if different values for misclassification costs are used during training in order to make global e-mail classifier 232a less stringent about what is classified as spam, as described more fully below. Then, during use, personal e-mail classifier 234a is retrained to track the user's subjective perceptions as to what is spam, also described more fully below.

In general, global e-mail classifier 232a is designed to be less stringent than personal e-mail classifier 234a about what is classified as spam. In other words, global e-mail classifier 232a classifies as spam only those e-mails that are extremely likely to be considered spam by most e-mail users, while more questionable e-mails are left unclassified (or tentatively classified as legitimate). The user then may fine-tune personal e-mail classifier 234a to classify the unclassified (or tentatively classified as legitimate) e-mail along the particular user's subjective perceptions as to what constitutes spam.

A number of techniques may be used singly or in combination to achieve a global e-mail classifier 232a that is less stringent than a personal e-mail classifier 234a about what is classified as spam. One method includes choosing e-mails for the training set that are known to be considered spam by most reasonable users. For example, databases of known spam are available at http://www.em.ca/~bruceg/spam/ and http://www.dornbos.com/spam01.shtml. Alternatively or additionally, a large ESP may use feedback from its users to develop a training set for spam e-mails. By providing its users with a mechanism to report received e-mail as spam, an ESP can collect a number of e-mails that the majority of its subscribers consider to be spam based on some measure such as a threshold number of complaints or a threshold percentage of complaints to similar e-mails passing through the system. Training global e-mail classifier 232a using training sets obtained in this manner automatically biases it to classify only those e-mails considered to be spam by a significant number of users. Then, as a particular user trains his or her personal e-mail classifier 234a, personal e-mail classifier 234a will become more strict about classifying those e-mails the user would consider to be spam.

Another method uses different classification thresholds for global e-mail classifier 232a and personal e-mail classifier 234a. As described above, global e-mail classifier 232a and personal e-mail classifier classify an e-mail by determining a probability measure that the e-mail is spam. When the probability measure exceeds a classification threshold, the e-mail is classified as spam. To bias global e-mail classifier 232a to be less stringent than personal e-mail classifier 234a, the classification threshold on global e-mail classifier 232a may be set higher than the classification threshold of personal e-mail classifier 234a. For example, the classification threshold for global e-mail classifier 232a may be set to 0.9999, while the classification threshold of personal e-mail classifier 234a may be set to 0.99. As another example, for a Naïve Bayes implementation, the global e-mail classifier 232a may be set such that an e-mail is classified as spam when the probability measure of the e-mail being spam is greater than the probability measure of the e-mail being legitimate plus a certain amount (e.g. one half of the difference between 1.0 and the probability of the e-mail being legitimate), while the personal e-mail classifier 234a may be set such that an e-mail is classified as spam when the probability measure that the e-mail is spam is greater that the probability measure that the e-mail is legitimate.

By using different classification thresholds, only e-mail with an extremely high likelihood of being spam is classified as such by global e-mail classifier 232a. In turn this means that more potential spam e-mail is let through, but this e-mail may be handled by personal e-mail classifier 234a, which can be tuned to the user's particular considerations of what is spam. In this way, global e-mail classifier 232a is less likely to mistakenly classify legitimate e-mail as spam e-mail. Such false positives can significantly lower the quality of service provided by the ESP, particularly when e-mail classified as spam e-mail by global e-mail classifier 232a is deleted.

Another method involves training or setting the classification thresholds of global e-mail classifier 232a and personal e-mail classifier 234a based on different misclassification costs. During classification, there is the chance that a spam e-mail will be misclassified as legitimate and that legitimate e-mail will be classified as spam. There are generally costs associated with such misclassifications. For the ESP, misclassifying spam e-mail as legitimate results in additional storage costs, which might become fairly substantial. In addition, failure to adequately block spam may result in dissatisfied customers, which may result in the customers abandoning the service. The cost of misclassifying spam as legitimate, however, may generally be considered nominal when compared to the cost of misclassifying legitimate e-mail as spam, particularly when the policy is to delete or otherwise block the delivery of spam e-mail to the e-mail user. Losing an important e-mail may mean more to a customer than mere annoyance.

In addition to a variation in misclassification costs between misclassifying spam e-mail as legitimate e-mail and misclassifying legitimate e-mail as spam e-mail, there may be a variation in the costs of misclassifying different categories of legitimate e-mail as spam e-mail. For instance, misclassifying personal e-mails may incur higher costs than misclassifying work related e-mails. Similarly, misclassifying work related e-mails may incur higher costs than misclassifying e-commerce related e-mails, such as order or shipping confirmations.

Probabilistic, other classifiers, and other scoring systems can be trained or designed to minimize these misclassification costs when classifying an e-mail. As described above, generally the misclassification costs for classifying a legitimate e-mail as a spam e-mail are higher than the misclassification costs for classifying a spam e-mail as a legitimate e-mail. With misclassification costs set to reflect this, a classifier trained to minimize misclassification costs will tend to err on the side of classifying items as legitimate (i.e., is less stringent as to what is classified as spam e-mail). Further, a classifier that has a higher misclassification cost assigned to misclassifying legitimate e-mail as spam e-mail will allow more spam e-mail to pass through as legitimate e-mail than a classifier with a lower misclassification cost assigned to such a misclassification.

Thus, assigning higher misclassification costs for global e-mail classifier 232a than for personal e-mail classifier 234a and training each in a way that minimizes misclassification costs will result in global e-mail classifier 232a being less stringent than personal e-mail classifier 234a as to what is classified as spam e-mail. For example, the misclassification costs of misclassifying spam e-mail as legitimate may be assigned a value of 1 for both classifiers, while the misclassification costs of misclassifying legitimate e-mail as spam e-mail may be assigned a value of 1000 for personal e-mail classifier 234a and a value of 10000 for global e-mail classifier 232a. Particularly when e-mail classified as spam by global e-mail classifier 232a is deleted, the misclassification costs of classifying legitimate e-mail as spam is higher for global e-mail classifier 232a than for personal e-mail classifier 234a. Thus, in this situation, the assigned misclassification costs additionally reflect the actual situation.

There are well-known techniques that account for misclassification costs when constructing the internal model of a classifier. For example, A. Kolcz and J. Alspector, *SVM-based Filtering of E-mail Spam with Content-Specific Misclassification Costs*, ICDM-2001 Workshop on Text Mining (TextDM-2001), November 2001 [hereinafter *Content-Specific Misclassification Costs*], incorporated herein by reference, provides a discussion of some techniques for training an SVM based probabilistic classifier in a manner that accounts for misclassification costs.

In addition to using varying misclassification costs between misclassifying spam e-mail as legitimate e-mail and vice versa, the classifiers 232a and 234a may be trained based on varying misclassification costs between misclassifying different types of legitimate e-mail as spam e-mail, which is also described in *Content-Specific Misclassification Costs*. In this case, the misclassification costs for each category of legitimate e-mail may be assigned a higher value for global e-mail classifier 232a than for personal e-mail classifier 234a. Table 1 illustrates an exemplary set of misclassification costs that may be assigned to the categories of legitimate e-mail described in *Content-Specific Misclassification Costs* and used to train personal e-mail classifier 232a and global e-mail classifier 234a so that global e-mail classifier 232a is less stringent than personal e-mail classifier 234a with regard to what is classified as spam.

TABLE 1

| Legitimate Category | Global e-mail classifier | Personal e-mail classifier |
| --- | --- | --- |
| Personal | 10000 | 1000 |
| Business Related | 5000 | 500 |
| E-Commerce Related | 1000 | 100 |
| Mailing Lists | 500 | 50 |
| Promotional Offers | 250 | 25 |

In addition to training a classifier in a manner that results in an internal model that minimizes misclassification costs, the classification threshold can be initially determined and set in a manner that minimizes misclassification costs. Thus, global e-mail classifier 232a may be biased according to higher misclassification costs using the classification threshold alternatively or in addition to biasing global e-mail classifier 232a through training. Co-pending U.S. Patent Application entitled "Classifier Tuning Based On Data Similarities," filed Dec. 22, 2003, describes techniques for determining a classification threshold that reduces assigned misclassification costs.

Figure 3:
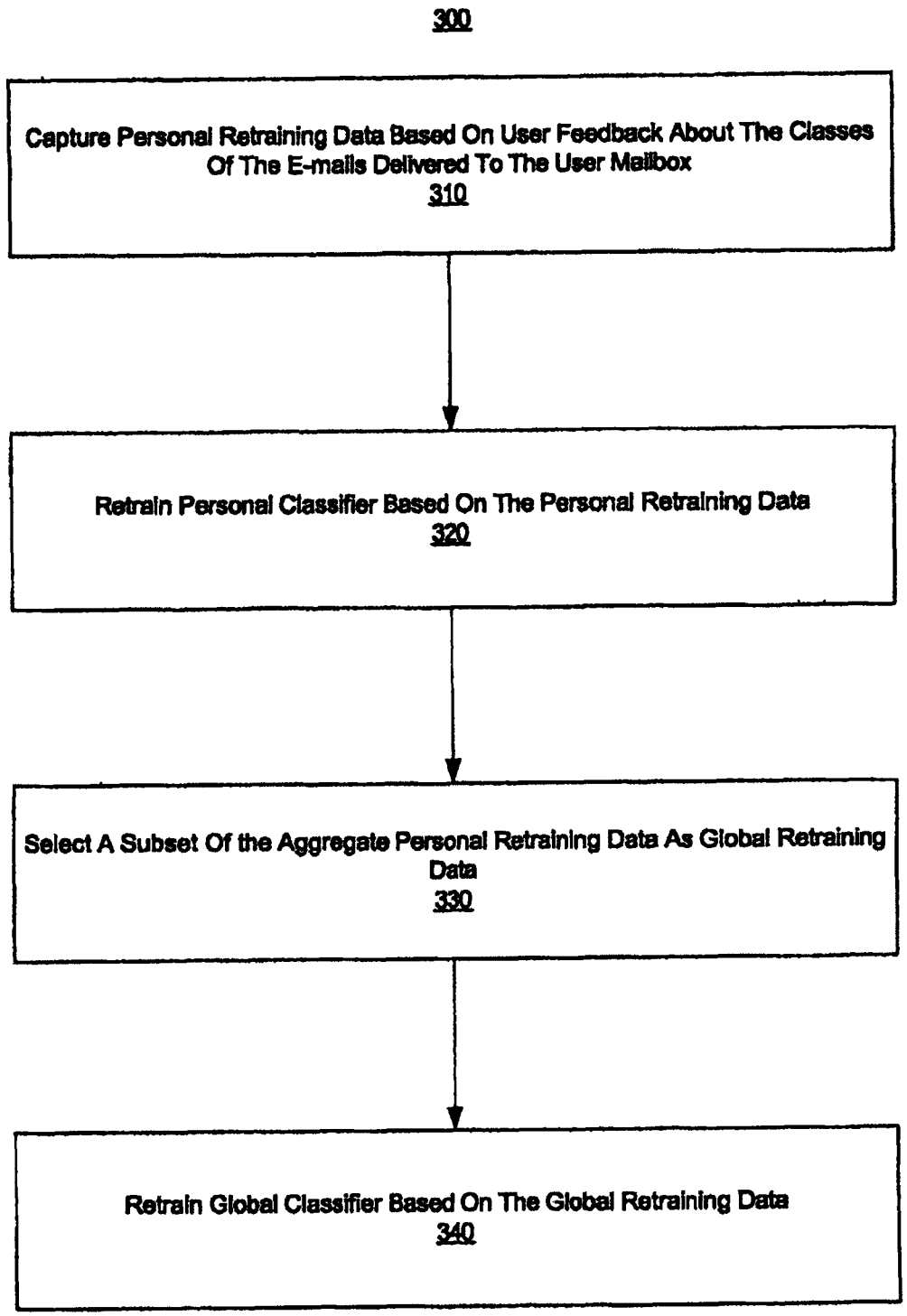
FIG. 3 is a flowchart illustrating a process by which personal and global e-mail classifiers 232*a* and 234*a* are retrained.

FIG. 3 is a flowchart illustrating a process 300 by which personal and global e-mail classifiers 232a and 234a are retrained. As described above, personal e-mail classifier 232a may be retrained according to the user's subjective determinations as to which e-mails are spam. To do so, personal retraining data is determined based on explicit and implicit user feedback about the class of the e-mails received in user mailbox 234 (310). Explicit feedback may include the user reporting an e-mail as spam, moving an e-mail from Inbox folder 234c to Spam folder 234d, or moving an e-mail from Spam folder 234d to Inbox 234c. Similarly, explicit feedback may include a user interface that allows a user to manually mark or change the class of an e-mail.

Implicit feedback may include the user keeping a message marked as new after the user has read the e-mail, forwarding the e-mail, replying to the e-mail, adding the sender's e-mail address to the user's address book, and printing the e-mail. Implicit feedback also may include the user not explicitly changing the classification of a message. In other words, there may be an assumption that the classification was correctly performed if the user does not explicitly change the class. If the described techniques are used in an instant messaging system, implicit feedback may include, for example, a user refusing to accept an initial message from a sender not on the user's buddy list.

From the user feedback, an actual class (at least as perceived by the user) of the e-mails in user mailbox 234 is obtained. For example, an e-mail that is moved to Spain folder 234d can be considered spam, while an e-mail that is forwarded can be considered legitimate. The personal retraining data (i.e., e-mails along with the actual class) then is used to retrain personal e-mail classifier in a manner that adapts or refines the personal e-mail classifier's internal model so as to track the user's subjective perceptions as to what is spam (320). For instance, the hyperplane boundary is recalculated in an SVM implementation or the probabilities are recalculated in a Naïve Bayesian implementation.

Each e-mail in user mailbox 234 along with its class may be used as personal retraining data. Alternatively, only those e-mails for which the classification is changed, along with their new classification, may be used as the personal retraining data. Further, incremental or online learning algorithms may be used to implement personal e-mail classifier 234a. An incremental learning algorithm is one in which the sample size changes during training. That is, an incremental algorithm is one that is based on the whole training dataset not being available at the beginning of the learning process; rather the system continues to learn and adapt as new data becomes available. An online learning algorithm is one in which the internal model is updated or adapted based on newly available data without using any past observed data. Using an online algorithm prevents the need to maintain all of the training/retraining data for each time personal e-mail classifier 234a is retrained. Instead, only the current retraining data is needed.

The retraining may occur automatically whenever a message is re-classified (e.g., when it is moved from Inbox folder 234c to Spam folder 234d or vice versa); after a certain number of e-mails have been received and viewed; or after a certain period of time has elapsed. Alternatively, the retraining may occur manually in response to a user command. For example, when an interface is provided to the user to explicitly mark the class of e-mails, that interface may allow the user to issue a command to retrain based on the marked class of each e-mail.

To retrain global e-mail classifier 232a, it may be appropriate or desirable to select a subset of the aggregate personal retraining data (i.e., the aggregate of the personal retraining data for the user mailboxes on the server) (330). That is, the personal retraining data for multiple or all of the user mailboxes on the system may be aggregated, and then a subset of this aggregate retraining data may be chosen as global retraining data. A number of techniques may be used singly or in combination to choose which e-mails from the aggregate personal retraining data are going to be used as global retraining data. For example, it may be desirable to select as global retraining data only those e-mails for which users have changed the classification. For each of these, the difference between the global e-mail classifiers' probability measure for the e-mail and the classification threshold may be computed. Generally, those incorrectly classified e-mails for which the global e-mail classifier's estimate produces the greatest difference are the ones that will provide the most information for retraining. Accordingly, the e-mails for which the magnitude of the difference exceeds a particular amount (a threshold difference) are chosen as the global retraining data. The particular amount may be based on various system parameters, such as the expected size of the aggregated personal retraining data and the target size of the global retraining data.

For example, if a first e-mail was classified as legitimate by global e-mail classifier 232a with a probability measure of 0.2 and the classification threshold is 0.9999, then the difference is 0.7999. If a threshold difference of 0.6 has been set, then the first e-mail would be chosen as retraining data. On the other hand, a second e-mail would not be chosen if the second e-mail was classified as legitimate with a probability measure of 0.6. For the second e-mail, the difference is 0.3999, which is less than 0.6.

An e-mail and its classification also may be selected as global retraining data based on some measure that indicates most reasonable people agree on the classification. One such measure may be a threshold number of users changing the classification of the e-mail. For example, if the majority of e-mail users change a particular e-mail's classification to spam or, conversely, the majority of users change it to legitimate, then the e-mail and its new classification may be chosen as retraining data. This technique may be combined with the one described above such that only those e-mails for which the classification has been changed by a threshold number of users may be selected from the aggregate personal retraining data. The difference is then calculated for those selected e-mails.

Other such measures may include the number of people per unit time that change the classification, or the percentage of users that change the classification. The measure may incorporate the notion of trusted users, i.e., certain user's who change their classification are weighted more heavily than other users. For example, the change in classification from users suspected of being spammers may be weighted less when calculating the measure than the changes from others who are not suspected of being spammers.

Once selected, the global retraining data is used to retrain global e-mail classifier 232a (340). Retraining may occur periodically or aperiodically. Retraining may be initiated manually, or automatically based on certain criteria. The criteria may include things such as a threshold number of e-mails being selected as the retraining data or the passing of a period of time.

As with personal e-mail classifier 234a, incremental or online algorithms may be used to implement global e-mail classifier 232a. Using an online learning algorithm eliminates the need to maintain the training/retraining data for each time global e-mail classifier 232a is retrained. Instead, only the current global retraining data is needed.

Once retrained, personal and global e-mail classifiers 232a and 234a may be applied to unopened e-mail in a user's mailbox. For instance, if a user has 50 e-mails in his or her inbox and the user changes the classification on 20 of the e-mails, the personal and global classifiers 232a and 234a may be retrained based on this information. The retrained classifiers 232a and 234a then may be applied to the remaining 30 e-mails in the user's mailbox before the user reads the remaining e-mails. The classifiers 232a and 234a may be applied to the remaining e-mails concurrently with the user's review of e-mails, in response to a manual indication that the user desires the classifier 232a and 234a be applied, or when the user decides to not review the remaining e-mails, for example, by exiting the e-mail client program.

The techniques described above are not limited to any particular hardware or software configuration. Rather, they may be implemented using hardware, software, or a combination of both. The methods and processes described may be implemented as computer programs that are executed on programmable computers comprising at least one processor and at least one data storage system. The programs may be implemented in a high-level programming language and may also be implemented in assembly or other lower level languages, if desired.

Any such program will typically be stored on a computer-usable storage medium or device (e.g., CD-Rom, RAM, or magnetic disk). When read into the processor of the computer and executed, the instructions of the program cause the programmable computer to carry out the various operations described above.

A number of implementations have been described. Nevertheless, it will be understood that various modifications may be made. For example, while user mailbox 234 has been shown with multiple folders on the server side, this may not be so. Rather the client program may include various folders and the e-mail may be marked in a certain way so that the client program will know whether it is spam or not and place it in the correct folder.

Also, for instance, the above description describes classifiers 232a and 234a as classifying an e-mail as spam if the probability measure as to whether the e-mail is spam is over a classification threshold. However, instead of evaluating an e-mail for a probability measure that the e-mail is spam, classifiers 232a and 234a instead may determine a probability measure as to whether the e-mail is legitimate and evaluate that probability measure to a "legitimate" classification threshold. In this case, global e-mail classifier 232a is more liberal about what e-mails are classified as legitimate (which means, conversely, global e-mail classifier 232a is more stringent about what is classified as spam e-mail. For instance, global e-mail classifier 234a may evaluate an e-mail and determine that the probability measure that the e-mail is a legitimate e-mail is 0.9. If the global e-mail classifier 234a has a classification threshold of, for example, 0.0001, the e-mail would be classified as legitimate.

In general, classifiers 232a and 234a may be implemented using any techniques (whether probabilistic or deterministic) that develop a spam score (i.e., a score that is indicative of whether an e-mail is likely to be spam or not) or other class score for classifying or otherwise handling an e-mail. Such classifiers are generally referred to herein as scoring classifiers.

Further, "classifying" a message does not necessarily have to include explicitly marking something as belonging to a class, rather, classifying may simply include providing the message with a spam or other class score. A message then may be handled differently based on its score. For example, a message may be displayed differently based on varying degrees of "spamminess." A first message, for instance, may be displayed in a darker shade of red (or other color) than a second message if the spam score of the first message is higher than the spam score of the second message (assuming a higher score indicates a greater chance the message is spam). Also, there may not always be an explicit classification threshold, but rather, the classification threshold or thresholds may simply be the score or scores at which the treatment of a message changes. Moreover, changing the class of an e-mail may include not only changing from one category to another, but also may include changing the degree to which the e-mail belongs to a category. For example, a user may be able to adjust the spam score up or down to indicate the degree to which the user considers the e-mail to be spam.

Classifiers 232a and 234a also may be designed to classify e-mail into more categories than just strictly spam e-mail or legitimate e-mail. For instance, at a global level, e-mails may be classified as spam e-mail, personal e-mail, and legitimate bulk mail (other categories are also possible). This allows other policies to be developed for global mail handler 232b. For example, if there is a high probability that an e-mail is not a personal e-mail, but it only has a small probability of being legitimate bulk e-mail, global mail handler 234b may be set to delete the e-mail. On the other hand, if the probability that the e-mail is a personal e-mail is lower, global mail handler 232b may be set to pass the e-mail to user mailbox 234. Furthermore, a user may establish different categories of mail such as work related, bulk e-mail, or news-related. In this way, a user may work to organize his or her e-mail, or to otherwise quickly identify e-mails belonging to certain categories. Likewise, there may be different categories of spam e-mail, such as mortgage related or pornographic, at the personal and/or global level. Thus, as used, classifying an e-mail as non-spam e-mail should be understood to include also classifying an e-mail in a sub-category of non-spam e-mail and classifying an e-mail as spam e-mail should be understood to include also classifying an e-mail in a sub-category of spam e-mail.

The above techniques are described as being applied to e-mail spam filtering. However, the techniques may be used for spam filtering in other messaging media, including both text and non-text media. For example, spam may be sent using instant messaging or short message service (SMS), or may appear on Usenet groups. Similarly, these techniques may be applied to filter spam sent in the form of images, sounds, or video.

Accordingly, other implementations are within the scope of the following claims.

What is claimed is:

1. A method of operating a spam filtering system in a messaging system that includes a message gateway and individual message boxes for users of the system, the method comprising the following operations performed by one or more processors:

aggregating personal retraining data used to retrain personal, scoring e-mail classifiers that classify messages delivered to the individual message boxes as spam when a score for the messages exceeds a first threshold for classifying the messages as spam, wherein personal retraining data for an individual message box is based on a user's feedback about the classes of messages in the user's individual message box;

determining a difference between a probability measure calculated for a message in the personal retraining data for the individual message box by a global, scoring e-mail classifier and a second threshold for classifying the messages as spam, the second threshold being higher than the first threshold;

selecting a subset of the aggregated personal retraining data as global retraining data for retraining the global, scoring e-mail classifier that classifies messages received at a message gateway as spam when the difference exceeds a difference threshold; and retraining the global, scoring e-mail classifier based on the global retraining data so as to adjust which messages are classified as spam.

2. The method of claim 1 wherein the user feedback is explicit.

3. The method of claim 2 wherein the explicit user feedback comprises one or more of the following: a user reporting a message as spam; moving a message from an Inbox folder in the individual message box to a Spam folder in the individual message box; or moving a message from an Spam folder in the individual message box to a Inbox folder in the individual message box.

4. The method of claim 1 wherein the feedback is implicit.

5. The method of claim 4 wherein the implicit feedback comprises one or more of the following: keeping a message as new after the message has been read; forwarding a message; replying to a message; printing a message; adding a sender of a message to an address book; or not explicitly changing a classification of a message.

6. The method of claim 1 wherein the aggregated personal retraining data comprises messages.

7. The method of claim 1 wherein the feedback comprises changing a message's class.

8. The method of claim 7 wherein selecting a subset of the aggregated personal retraining data comprises selecting a message as global retraining data when a particular number of users change the message's classification.

9. The method of claim 1 wherein the messages are e-mails.

10. The method of claim 1 wherein the messages are e-instant messages.

11. The method of claim 1 wherein the messages are SMS messages.

12. The method of claim 1 wherein, to classify a message, the global, scoring e-mail classifier uses an internal model to determine a probability measure for the message and compares the probability measure to a classification threshold.

13. The method of claim 12 wherein, to classify a message, the personal, scoring e-mail classifier uses an internal model to determine a probability measure for the message and compares the probability measure to a classification threshold, the method further comprising initializing the personal, scoring e-mail classifier's internal model using the internal model for the global, scoring e-mail classifier.

14. A non-transitory computer-usable medium storing a computer program for operating a spam filtering system in a messaging system that includes a message gateway and individual message boxes for users of the system, the computer program comprising instructions for causing at least one processor to:

aggregate personal retraining data used to retrain personal, scoring e-mail classifiers that classify messages delivered to the individual message boxes as spam when a score for the messages exceeds a first threshold for classifying the messages as spam, wherein personal retraining data for an individual message box is based on a user's feedback about the classes of messages in the user's individual message box;

determine a difference between a probability measure calculated for a message in the personal retraining data for the individual message box by a global, scoring e-mail classifier and a second threshold for classifying the messages as spam, the second threshold being higher than the first threshold;

select a subset of the aggregated personal retraining data as global retraining data for retraining the global, scoring e-mail classifier that classifies messages received at a message gateway as spam when the difference exceeds a difference threshold; and retrain the global, scoring e-mail classifier based on the global retraining data so as to adjust which messages are classified as spam.

15. The medium of claim 14 wherein the user feedback is explicit.

16. The medium of claim 15 wherein the explicit user feedback comprises one or more of the following: a user reporting a message as spam; moving a message from an Inbox folder in the individual message box to a Spam folder in the individual message box; or moving a message from an Spam folder in the individual message box to a Inbox folder in the individual message box.

17. The medium of claim 14 wherein the feedback is implicit.

18. The medium of claim 17 wherein the implicit feedback comprises one or more of the following: keeping a message as new after the message has been read; forwarding a message; replying to a message; printing a message; adding a sender of a message to an address book; or not explicitly changing a classification of a message.

19. The medium of claim 14 wherein the aggregated personal retraining data comprises messages.

20. The medium of claim 14 wherein the feedback comprises changing a message's class.

21. The medium of claim 20 wherein to select a subset of the aggregated personal retraining data, the computer program further comprises instructions for causing a processor to select a message as global retraining data when a particular number of users change the message's classification.

22. The medium of claim 14 wherein the messages are e-mails.

23. The medium of claim 14 wherein the messages are e-instant messages.

24. The medium of claim 14 wherein the messages are SMS messages.

25. The medium of claim 14 wherein, to classify a message, the global, scoring e-mail classifier uses an internal model to determine a probability measure for the message and compares the probability measure to a classification threshold.

26. An apparatus for operating a spam filtering system in a messaging system that includes a message gateway and individual message boxes for users of the system, the apparatus comprising:

a network interface configured to receive personal retraining data for an individual message box used to retrain personal, scoring e-mail classifiers that classify messages delivered to the individual message boxes as spam when a score for the messages exceeds a first threshold for classifying the messages as spam, wherein the personal retraining data is based on a user's feedback about the classes of messages in the user's individual message box over one or more network connections; and at least one processor configured by a set of instructions to
(i) aggregate the received personal retraining data,
(ii) determine a difference between a probability measure calculated for a message in the personal retraining data for the individual message box by a global, scoring e-mail classifier and a second threshold for classifying the messages as spam, the second threshold being higher than the first threshold,
(iii) select a subset of the aggregated personal retraining data as global retraining data for retraining the global, scoring e-mail classifier that classifies messages received at a message gateway as spam when the difference exceeds a difference threshold, and
(iii) retrain the global, scoring e-mail classifier based on the global retraining data so as to adjust which messages are classified as spam.

\* \* \* \* \*